United States Patent [19]

Taft

[11] Patent Number: 4,559,780
[45] Date of Patent: Dec. 24, 1985

[54] POWER VALVE FOR A VEHICLE BRAKING SYSTEM

[75] Inventor: Philip A. Taft, Solihull, England

[73] Assignee: Lucas Industries Limited, Birmingham, England

[21] Appl. No.: 435,942

[22] Filed: Oct. 22, 1982

[30] Foreign Application Priority Data

Nov. 5, 1981 [GB] United Kingdom ............... 8133452

[51] Int. Cl.[4] ............... F15B 7/00; B60T 15/04
[52] U.S. Cl. ........................ 60/548; 60/553; 60/562; 60/569; 60/591
[58] Field of Search ............. 60/562, 569, 548, 591, 60/553; 91/520

[56] References Cited

U.S. PATENT DOCUMENTS

| | | | |
|---|---|---|---|
| 2,442,601 | 6/1948 | House et al. | 60/569 |
| 2,458,803 | 1/1949 | Stelzer | 60/553 X |
| 3,222,868 | 12/1965 | Stelzer | 60/553 X |
| 3,407,947 | 10/1968 | Valla | 91/520 |
| 3,499,287 | 3/1970 | Schrader | 60/562 |
| 3,575,001 | 4/1971 | Wilson et al. | 60/562 |
| 3,640,067 | 2/1972 | Ingram | 60/581 X |
| 3,683,619 | 8/1972 | Belart | 60/548 |
| 3,922,858 | 12/1975 | Sadler | 60/562 |
| 3,972,192 | 8/1976 | Muterel | 60/591 |
| 4,077,217 | 3/1978 | Leiber | 60/562 |
| 4,294,070 | 10/1981 | Farr | 60/562 |

Primary Examiner—Sheldon J. Richter
Assistant Examiner—Randolph A. Smith
Attorney, Agent, or Firm—Scrivener Clarke Scrivener and Johnson

[57] ABSTRACT

A power valve for a vehicle braking system includes a main pressure chamber (4) defined between the body (1) and spool (2) and connected to the outlet (5), the spool being displaceable under an input effort to close communication between the chamber (4) and a reservoir port (8) and open communication of the chamber (4) with an inlet (7), and an auxiliary chamber (10) to which fluid pressure may be supplied through a port (11) to exert a force on the spool for reducing the pressure supplied to the outlet (5) for a given input effort applied to the spool (2).

9 Claims, 2 Drawing Figures

POWER VALVE FOR A VEHICLE BRAKING SYSTEM

This invention relates to vehicle braking systems, and in particular to a braking system of the kind in which brakes mounted on opposite sides of the vehicle are selectively operable either together for normal, straight line braking, or independently to assist vehicle steering. Such systems are commonly employed on agricultural tractors and similar vehicles.

Instead of actuating a pressure source such as a master cylinder directly by means of a pedal, with or without an intervening booster, for operating the vehicle brakes, it is known to employ a pressurised source, such as a pump or accumulator and to control communication between the brakes and the pressurised source with a so-called power valve which may itself be operated by the brake pedal.

The invention is specifically concerned with a power valve suitable for a braking system of the kind initially described.

A known power valve as disclosed, for example, in published British application No. GB 2 099 940A, comprises a body having a stepped bore, a spool received in the bore and including an inner end slidable in an inner part of the bore and a rear end of greater diameter sealed to the body and confining therewith a pressure chamber, the body having an inlet for fluid under pressure, an outlet communicating with the pressure chamber, and a reservoir port normally communicating with the pressure chamber, the spool being displaceable under an applied input effort to interrupt communication between the reservoir port and the pressure chamber and to open up communication between the inlet and the pressure chamber for a pressure dependent upon the magnitude of the input effort to be supplied to the outlet.

In a braking system of the kind initially described, it is desirable for a given effort applied to the pedal to result in a higher braking pressure when the brake at one side of the vehicle only is being operated, since it allows the driver to lock more easily the braked wheel, e.g. for executing a spin turn. The known power valve described above does not allow this result to be achieved.

The present invention aims to overcome this drawback and accordingly provides a power valve which is characterised in that an auxiliary chamber is defined by the inner bore part and is sealed against direct communication with the pressure chamber, and a control port is connected to the auxiliary chamber for supplying fluid pressure to said chamber to exert a force on the spool opposing inward movement of the spool and thereby to modify the pressure supplied to the outlet for a given input effort applied to the spool.

By supplying fluid under pressure to the auxiliary chamber the power valve characteristic of outlet pressure to applied pedal effort can be easily modified.

In a particularly convenient construction the inner end of the spool is acted upon over its full area directly by the pressure in the auxiliary chamber.

For a better understanding of the invention reference will now be made to the accompanying drawings, in which.

Figure 1:
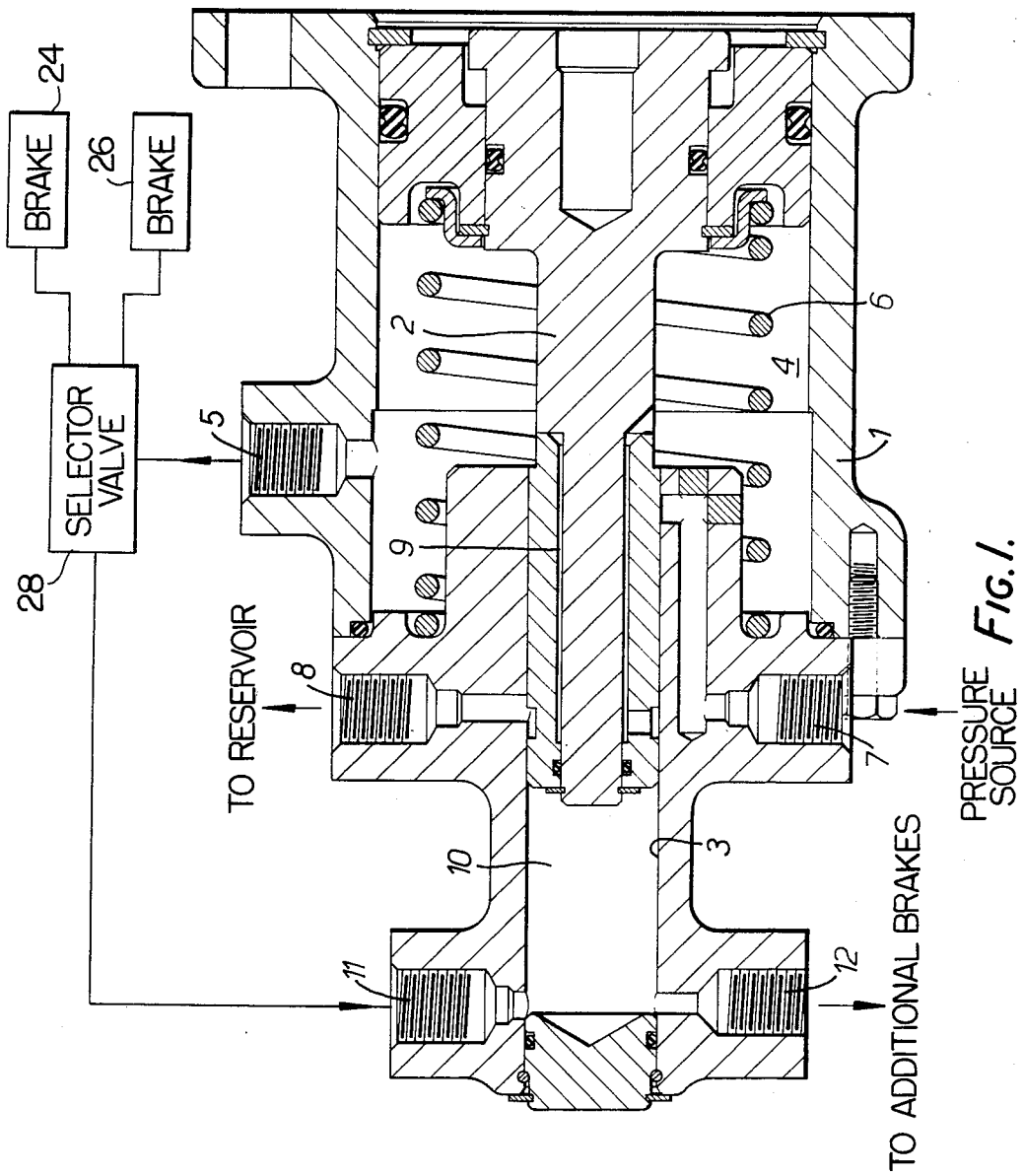
FIG. 1 is an axial section through a first embodiment of the invention.

The power valve illustrated in FIG. 1 comprises a two part body 1 defining a stepped bore and receiving a spool 2, the inner end of which slides in the inner end part 3 of the bore. The rear end of the spool is sealed to the body and partially defines a pressure chamber 4 having an outlet port 5 and accommodating a return spring 6 for the spool 2. A pressure fluid port 7, connected in use to a pressure accumulator, is provided in the body and opens into the bore part 3 adjacent the rear end thereof. A reservoir port 8 also provided in the body opens into the bore part 3 at a more forward position and, as shown, normally communicates with the pressure chamber 4 via a passage 9 formed in the spool 2 while the inlet port 7 is cut off from the chamber 4. The spool 2 includes an intermediate portion of slightly reduced diameter which brings the inlet port 7 and chamber 4 into communication when the spool is displaced forwardly under an input effort.

As so far described the valve is known and the operation will be understood by those readers skilled in the art. Briefly, pushing the valve spool forwards firstly cuts off communication between the reservoir port 8 and the chamber 4, and therefore the brakes, after which the connection between the inlet port 7 and the chamber is opened. The pressure builds up in the chamber and acts on the rear end of the spool to opposite further forward displacement, the final pressure delivered to the brakes being determined when the input effort is balanced.

According to the invention the body 1 is extended to define an auxiliary pressure chamber or space 10, the inner end of the spool 2 being exposed to the pressure in this chamber and the body including an inlet port 11 and possibly an outlet port 12. Any pressure in chamber 10 also opposes forward motion of the spool 2, with the effect that a lower ouput pressure is obtained at port 5 for a given input effort on the spool.

In use the outlet port 5 is connected to the brakes 24, 26 on either of the vehicle by a selector valve device 28 which determines whether the pressure fluid is supplied to all the brakes 24, 26 for normal in line braking, or to a selected brake 24 or 26 only to assist steering. With the improved power valve of the invention the selector valve 28 will be arranged to control also communication between the pressure chamber outlet port 5 and the inlet port 11 of the auxiliary chamber 10. The ports 5, 11 will be connected together when all the brakes 24, 26 are to be operated for normal vehicle deceleration and will be disconnected when only a selected brake 24 or 26 is operated for steering. Thus, a given input effort applied e.g. by means of a pedal, on spool 2 will be counterbalanced by a lower pressure in chamber 4 (since this pressure also acts on the inner end of spool 2 in chamber 10) when all the brakes 24, 26 are being actuated than the pressure in the chamber 4 required to balance the same input effort when only a selected brake is operated and chamber 10 is not pressurised. Put another way, a given input effort produces a higher braking pressure at the brakes when the system is operated in the steering mode.

The outlet 12 from chamber 10 may be used to supply fluid to brakes which are to be operated only when the brakes are to be applied in the normal in line mode, such as front brakes of a tractor or the brakes of a trailer being towed by the vehicle.

Figure 2:
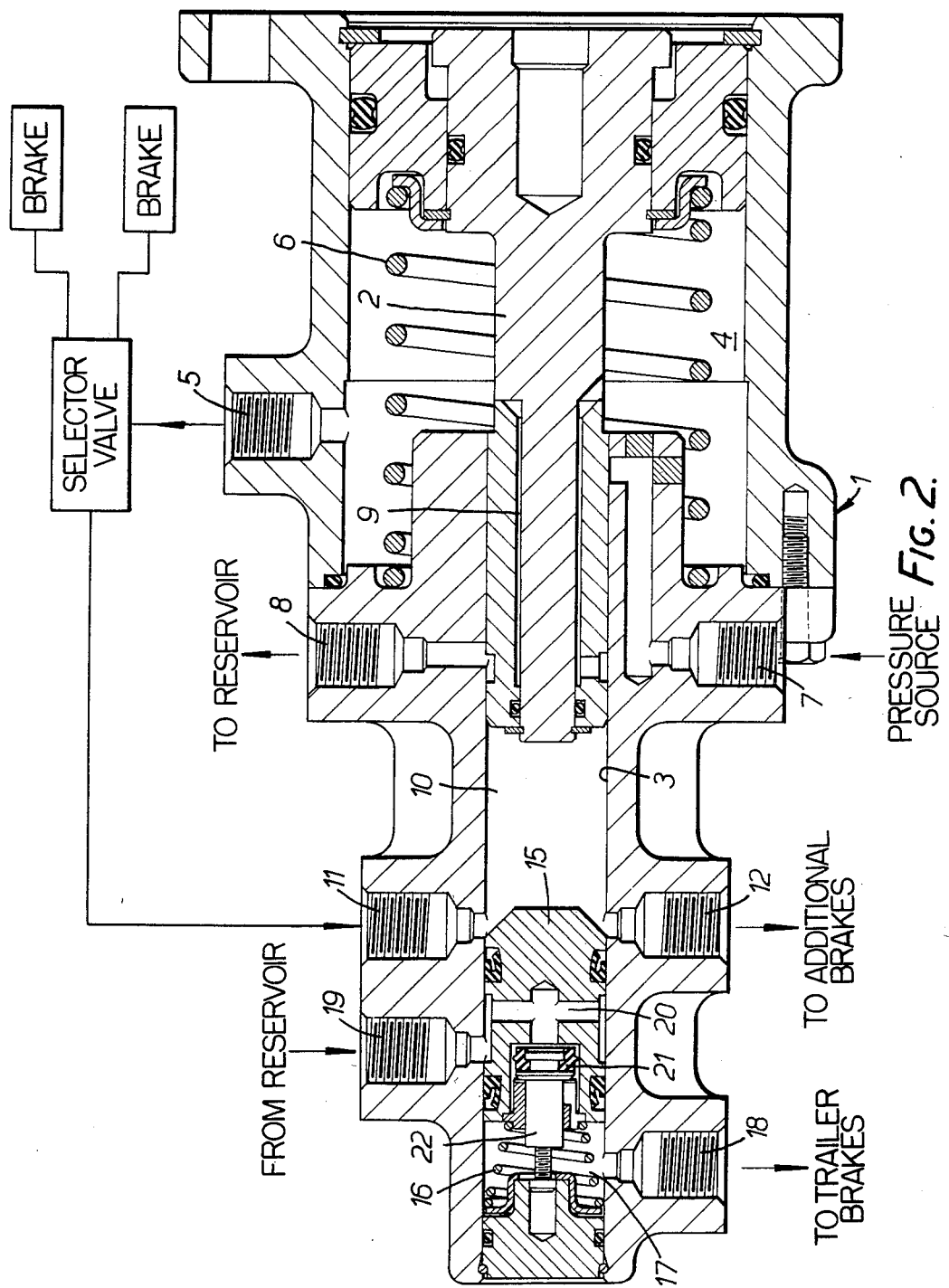
FIG. 2 is a similar view showing another embodiment of the invention.

The modified power valve of FIG. 2 is adapted to control operation of auxiliary brakes, such as trailer brakes, which are normally operated from an independent pressure source. The parts equivalent to those in FIG. 1 have been identified with the same reference numerals. The forward end of chamber 10 is closed by a piston 15 normally biased to the position shown by a spring 16. The front end of the piston confines with the body a further chamber 17 having an outlet 18 and normally communicating with a reservoir port 19 through a passageway 20 in the piston 15. A valve for closing the passageway 20 consists of a valve member 21 carried on a pin 22 supported for limited axial movement in the forward end wall of chamber 17.

When the chamber 10 is pressurised piston 15 is displaced forwardly to close the valve 21 and pressurise chamber 17 so that the trailer brakes are operated, but if chamber 10 is not pressurised the valve stays open and chamber 17 remains in communication with the reservoir. Thus the trailer brakes will be operated only if the main vehicle brakes are applied for normal straight line braking. With the FIG. 2 valve the trailer braes are under the control of the power valve but remain isolated for the main braking system.

What is claimed is:

1. In a power valve for controlling the flow of pressurised fluid from a source of pressurized fluid to a vehicle braking system, comprising a body having a stepped bore including inner and outer parts, a spool received in the bore and having an inner end slidable in said inner bore part and a rear end sealed to the body, and a pressure chamber confined in the outer part of the bore between the body and the spool, the body including an inlet for fluid under pressure, an outlet communicating with the pressure chamber and a reservoir port normally communicating with the pressure chamber, and the spool being displaceable under an applied input effort to interrupt said communication between the reservoir port and the pressure chamber and to open up communication between the inlet and pressure chamber for a dependent upon the magnitude of the input effort to be supplied to the outlet, the improvement which comprises:

an auxiliary chamber defined in said inner bore part and sealed against direct communication with said pressure chamber; and a control port in the body connected to the auxiliary chamber, and means for selectively supplying fluid pressure through said control port to said auxiliary chamber to exert a force on the spool opposing inward movement of the spool and thereby to selectively modify the pressure supplied to said outlet for a given input effort applied to the spool.

2. The improved power valve of claim 1, wherein said auxiliary chamber is partially confined by the spool whereby the spool is acted upon directly by the pressure in the auxiliary chamber.

3. The improved power valve of claim 2, wherein the pressure in the auxiliary chamber acts on the full area of the inner end of the spool.

4. The improved power valve of claim 1, including means responsive to the pressure in the auxiliary chamber and actuable therby for supplying fluid under pressure to a brake not coupled directly to said outlet.

5. The improved power valve of claim 4, wherein the body includes a control chamber, and a reservoir port normally communicating with the control chamber, and said means responds to pressure in the auxiliary chamber to close said communication between the control chamber and said reservoir port and to generate a pressure in the control chamber.

6. The improved power valve of claim 5, wherein said means comprises a piston separating the auxiliary and control chambers, a spring urges the piston towards the auxiliary chamber, a passage is formed in the piston and normally connects the control chamber with said reservoir port, and a valve is provided to close the passage in response to displacement of the piston under pressure in the auxiliary chamber.

7. The improved power valve of claim 1, wherein the modification of the pressure supplied to the outlet is a decrease in said outlet pressure for said given input effort applied to said spool.

8. In a power valve for controlling the flow of pressurised fluid from a source of pressurized fluid to a vehicle braking system, comprising a body having a stepped bore including inner and outer parts, a spool received in the bore and having an inner end slidable in said inner bore part and a rear end sealed to the body, and a pressure chamber confined in the outer part of the bore between the body and the spool, the body including an inlet for fluid under presssure, an outlet communicating with the pressure chamber, a reservoir port normally communicating with the pressure chamber, and the spool being displaceable under an applied input effort to interrupt said communication between the reservoir port and the pressure chamber and to open up communication between the inlet and pressure chamber for a pressure dependent upon the magnitude of the input effort to be supplied to the outlet, the improvement which comprises:

an auxiliary chamber defined in said inner bore part and sealed against direct communication with said pressure chamber;

a control port in the body connected to the auxiliary chamber, and means for selectively supplying fluid pressure through said control port to said auxiliary chamber to exert a force on the spool opposing inward movement of the spool and thereby to selectively modify the pressure supplied to said outlet for a given input effort applied to the spool;

in combination therewith:

a fluid reservoir connected to said reservoir port, a source of pressurized fluid connected to the inlet, at least one brake connected to said outlet, and valve means selectively operable to connect the control port either to said outlet or to said reservoir.

9. The combination of claim 8, wherein the valve means is a selector valve, a plurality of brakes are connected to the outlet port through the selector valve, and the selector valve is arranged to connect the control port of the auxiliary chamber of the power valve to the outlet only when all the brakes are connected through the selector valve to the outlet.

* * * * *